J. LASHBROOKS
Straw Cutter.

No. 21,970.  Patented Nov. 2, 1858.

UNITED STATES PATENT OFFICE.

JAMES LASHBROOKS, OF ROCKPORT, INDIANA.

STRAW-CUTTER.

Specification of Letters Patent No. 21,970, dated November 2, 1858.

*To all whom it may concern:*

Be it known that I, JAMES LASHBROOKS, of Rockport, in the county of Spencer and State of Indiana, have invented a new and Improved Straw-Cutter; and I do hereby declare that the following is a full, clear, and exact description of the same, reference being had to the annexed drawings, making a part of this specification, in which—

Figure 1:
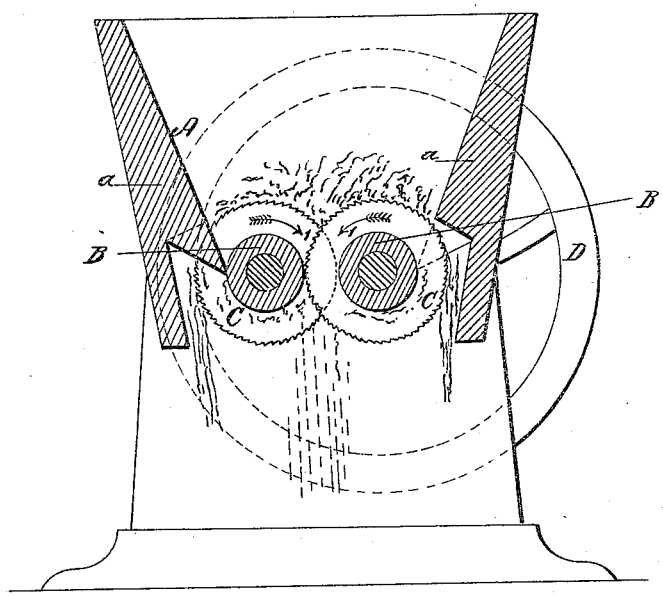
Figure 2:
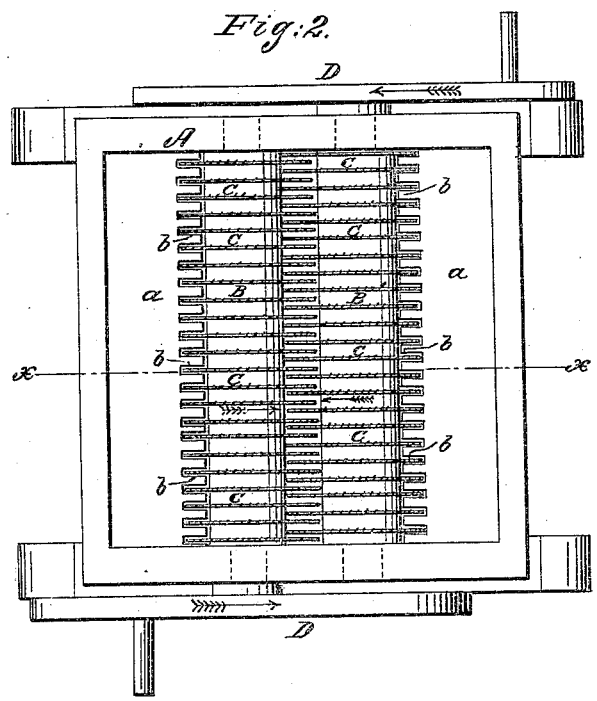

Figure 1, is a vertical central section of my invention taken in the line $x, x$, Fig. 2. Fig. 2, is a plan or top view of ditto.

Similar letters of reference indicate corresponding parts in the two figures.

This invention consists in placing series of toothed circular blades on parallel rollers fitted within a hopper, the blades being arranged relatively with each other and with clearing prongs, as hereinafter fully shown and described whereby the desired work may be done with great rapidity, in a perfect manner and without danger of clogging or choking the machine.

To enable those skilled in the art to fully understand and construct my invention, I will proceed to describe it.

A, represents a hopper of suitable dimensions supported at a proper height and having inclined sides $a, a$, and two parallel rollers B, B, fitted within it at a suitable distance apart. On each roller B, a series of circular toothed blades C, is placed, the blades of one cylinder overlapping those of the other, as shown plainly in Fig. 2. The blades B, are of steel and may be toothed like a saw or have fine sickle edges.

The lower part of each side $a$, is recessed longitudinally so as to form projecting ends $b$, which fit between the blades of each roller and nearly touch the peripheries of the rollers. The ends or prongs $b$, having a tangential position relatively with the rollers, and the prongs are of taper or wedge shape as shown clearly in Fig. 1, so as to be best calculated to serve as clearers, see Fig. 1.

On the end of each roller B, a crank wheel D, is placed, and the rollers B, are rotated in the direction indicated by the arrows 1. The straw to be cut is placed in the hopper A, and is cut into proper lengths by the action of the circular toothed blades C, the length of the cut straw being equal to the spaces between the overlapping edges of the blades. The prongs $b$, keep the spaces between the blades of each roller perfectly clear from cut straw the prongs scraping off the straw as the rollers rotate.

This machine performs its work with great rapidity and in a perfect manner. In case it is used as a power machine the rollers B, may be connected at one end by gearing so that the power may be applied directly to one roller only, but in case it is to be operated manually a crank wheel should be attached to each roller and a person placed at each end of the machine one to each roller.

I do not claim separately any of the parts, but

I claim as new and desire to secure by Letters Patent,

The two rollers B, B, provided with the circular toothed blades C, in combination with the clearers $b$, the whole being arranged to operate as and for the purpose set forth.

JAMES LASHBROOKS.

Witnesses:
M. L. BELLVILLE,
T. F. DE BRULER.